United States Patent
Kang et al.

(10) Patent No.: US 6,580,185 B2
(45) Date of Patent: Jun. 17, 2003

(54) INTEGRATED SYSTEM OF A PERMANENT MAGNET EXCITED MOTOR AND A NON-CONTACT POWER FEEDING APPARATUS

(75) Inventors: Do Hyun Kang, Kyungsangnam-do (KR); Yeong Han Chun, Kyungsangnam-do (KR); Jeong Woo Jeon, Kyungsangnam-do (KR)

(73) Assignee: Korea Electrotechnology Research Institute, Kyungsangnam-do (KR)

( * ) Notice: Subject to any disclaimer, the term of this patent is extended or adjusted under 35 U.S.C. 154(b) by 0 days.

(21) Appl. No.: 10/029,858

(22) Filed: Dec. 31, 2001

(65) Prior Publication Data

US 2002/0093252 A1 Jul. 18, 2002

(30) Foreign Application Priority Data

Dec. 29, 2000 (KR) .................................... 2000-0086054

(51) Int. Cl.$^7$ .............................. H02K 1/27; B61L 1/00
(52) U.S. Cl. ............................. 310/12; 310/12; 310/13; 310/14; 310/15; 104/292; 236/214
(58) Field of Search ............................. 310/12, 13, 14, 310/15; 104/292; 336/214, 215, 180, 182, 183, 184

(56) References Cited

U.S. PATENT DOCUMENTS 6,242,822 B1 * 6/2001 Stothmann .................. 310/12
6,499,701 B1 * 12/2002 Thornton .................... 246/194

\* cited by examiner

Primary Examiner—Burton S. Mullins
Assistant Examiner—Iraj A Mohandesi
(74) Attorney, Agent, or Firm—Rothwell, Figg, Ernst & Manbeck

(57) ABSTRACT

The present invention relates to an integrated system in which a bilateral permanent magnet excited synchronous motor part and a non-contact power feeding part are combined in order to generate a linear driving force and to feed an electric power without any contact. The present integrated system comprises a bilateral permanent magnet excited synchronous motor for generating a linear driving force; and a non-contact power feeding apparatus for receiving an electric power without any mechanical contact from the bilateral permanent magnet excited synchronous motor, wherein the bilateral permanent magnet excited synchronous motor is composed of a stator core with a long air-gap formed at one side, a stator motor windings inducing traveling magnetic fields in the stator core, stator transformer wires winding both flanks of the stator core, and a motor runner sliding longitudinally along the air-gap, and wherein the non-contact power feeding apparatus is composed of a secondary core, and secondary wires winding the secondary core. The present invention enables non-contact power supply by simply installing a long core at the part of a runner and winding wires around the long core and a stator transformer, therefore, this non-contact power feeding way reduces the cost of system manufacture and provides very clean transportation system.

4 Claims, 5 Drawing Sheets

INTEGRATED SYSTEM OF A PERMANENT MAGNET EXCITED MOTOR AND A NON-CONTACT POWER FEEDING APPARATUS

BACKGROUND OF THE INVENTION

1. Field of the Invention

The present invention relates to an integrated system of a permanent magnet excited synchronous motor and a non-contact power feeding apparatus, more particularly, to an integrated system in which a bilateral permanent magnet excited synchronous motor part and a non-contact power feeding part are combined together in order to generate a linear driving force and to feed an electric power without any contact.

2. Description of the Related Art

In general, when a moving part of a linear motor requires an electric power, it is supplied through a cable or a bus bar with contact. For example, a crane is fed with an electric power through a cable being wound or loosened and a maglev train or an electric railway car is supplied through a bus bar or a current collector.

However, such a contact-way of feeding power to a moving part through a cable or a bus bar requires complex structure and is liable to cause break-down of a system due to friction.

SUMMARY OF THE INVENTION

It is an object of the present invention to provide an integrated system of a permanent magnet excited synchronous motor and a non-contact power feeding apparatus which uses a bilateral permanent magnet linear synchronous motor propulsive system as it is while feeding an electric power to a runner without any contact.

An integrated system of a permanent magnet excited synchronous motor and a non-contact power feeding apparatus in accordance with the present invention comprises a bilateral permanent magnet excited synchronous motor for generating a linear driving force; and a non-contact power feeding apparatus for receiving an electric power without any mechanical contact from the stator core of bilateral permanent magnet excited synchronous motor, wherein the bilateral permanent magnet excited synchronous motor consists of a stator core with an air-gap formed longitudinally at a side, stator motor windings inducing traveling magnetic fields in the stator core, stator transformer wires winding both flanks of the stator core, and a motor runner sliding longitudinally along the air-gap of the stator core, and wherein the non-contact power feeding apparatus consists of a core corresponding to a secondary core of a transformer, and wires winding the core, the wires corresponding to secondary windings of a transformer, the core and the wires of the non-contact power feeding apparatus sliding longitudinally along the air-gap.

The present invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein.

DETAILED DESCRIPTION OF THE PREFERRED EMBODIMENT

In order that the present invention may be fully understood, a preferred embodiment thereof will now be described with reference to the accompanying drawings.

Figure 1:
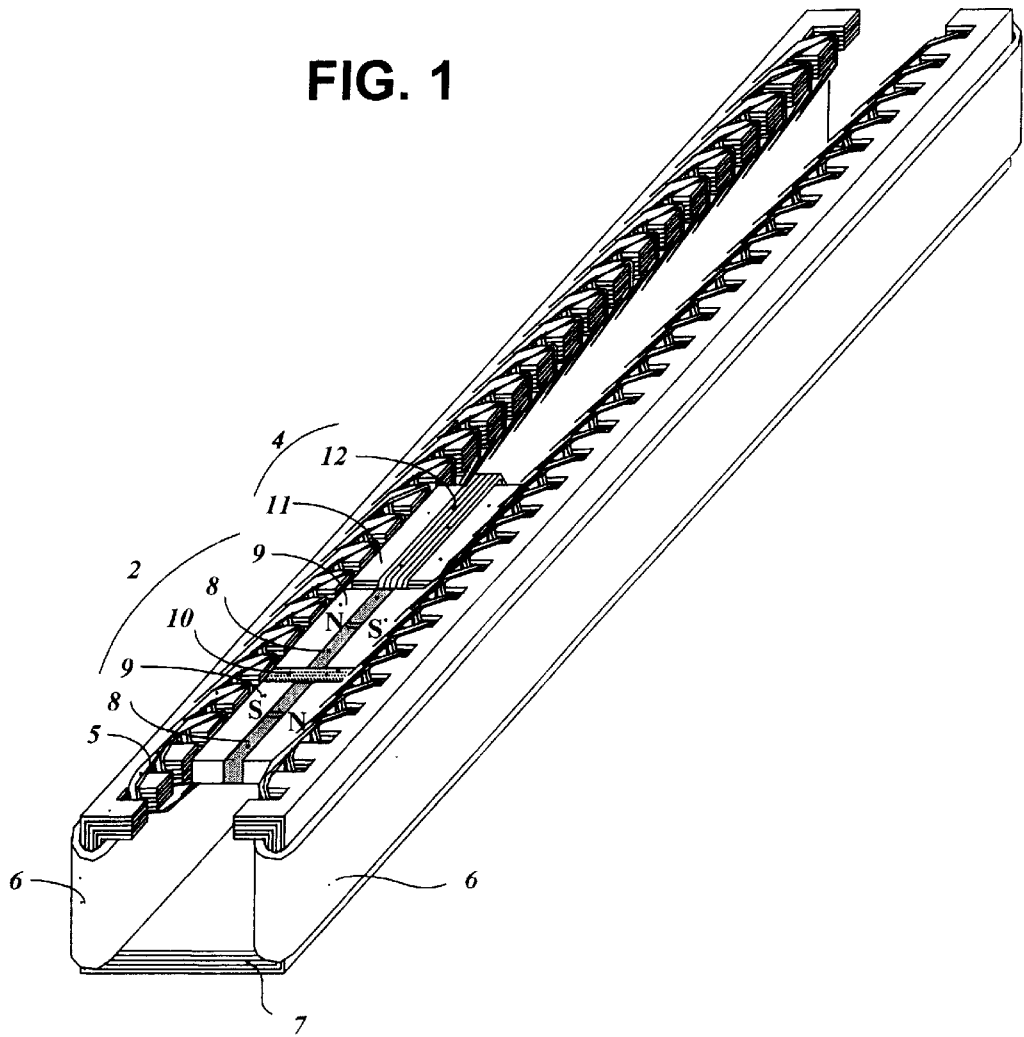
FIG. 1 illustrates an exemplary embodiment of an integrated system of a permanent magnet excited synchronous motor and a non-contact power feeding apparatus in accordance with the present invention.
Figure 2:
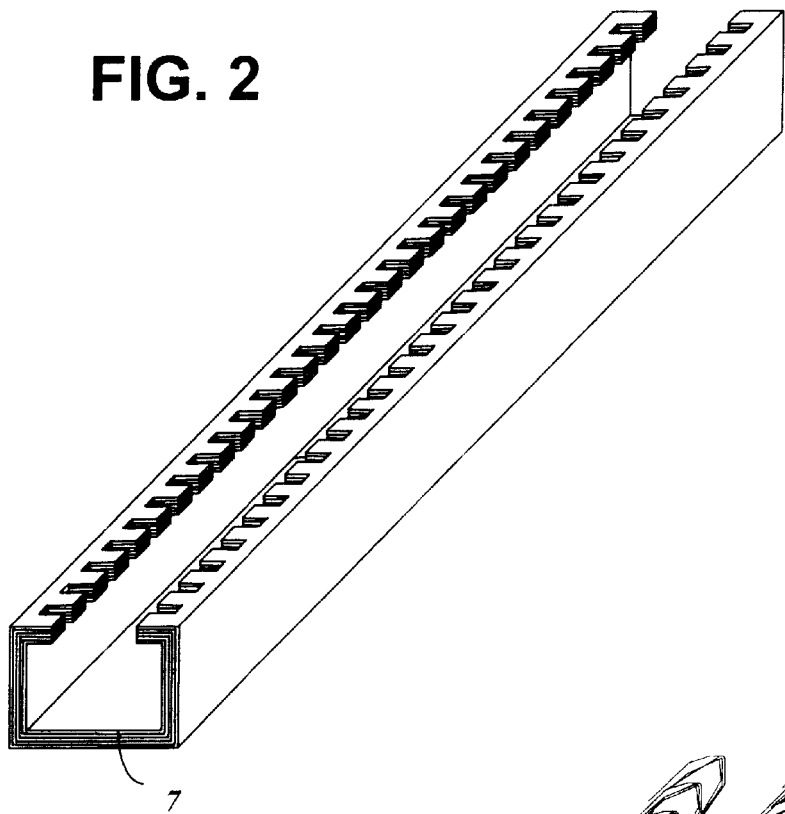
FIG. 2 depicts a stator core separated from the integrated system.

FIG. 1 illustrates an exemplary embodiment of an integrated system of a permanent magnet excited synchronous motor and a non-contact power feeding apparatus in accordance with the present invention.

The embodiment of FIG. 1 comprises a bilateral permanent magnet excited synchronous motor for generating a linear driving force; and a non-contact power feeding unit receiving an electric power without any mechanical contact through an air-gap formed in the bilateral permanent excited synchronous motor and feeding it to a moving part thereof.

The bilateral permanent magnet excited synchronous motor is composed of 3-phase stator windings 5; stator transformer windings 6; a stator core 7; and a motor runner 2, which consists of two permanent magnets 8 and two motor cores 9 placed before and behind an intermediate non-magnetic substance 10. The two permanent magnets 8 are arranged in such a manner their polarities are opposite each other.

The stator core 7 is also used in the non-contact power feeding unit in common, therefore, the stator transformer windings 6 and the stator core 7 also constitutes the non-contact power feeding unit.

In the bilateral permanent magnet excited synchronous motor, the permanent magnets 8 is adopted for the motor runner 2 to produce stronger force and improve efficiency at a given volume. And, an air-gap is formed at both sides of each runner 2 to double force producing area for a conventional motor. When a three-phase electric power is applied a three-phase current flows through the stator motor windings 5, thus a flux is generated from the stator core 7.

Because the frequency of the three-phase electric power is high, the stator core 7 is laminated and hollowed longitudinally to reduce core loss. A long air-gap is formed an upper part of the stator core 7, and the moving part is moved along the air-gap. Both bilateral sides of the upper air-gap are uneven with slots and teeth in order that the stator motor windings 5 might be wound easily.

Figure 3:
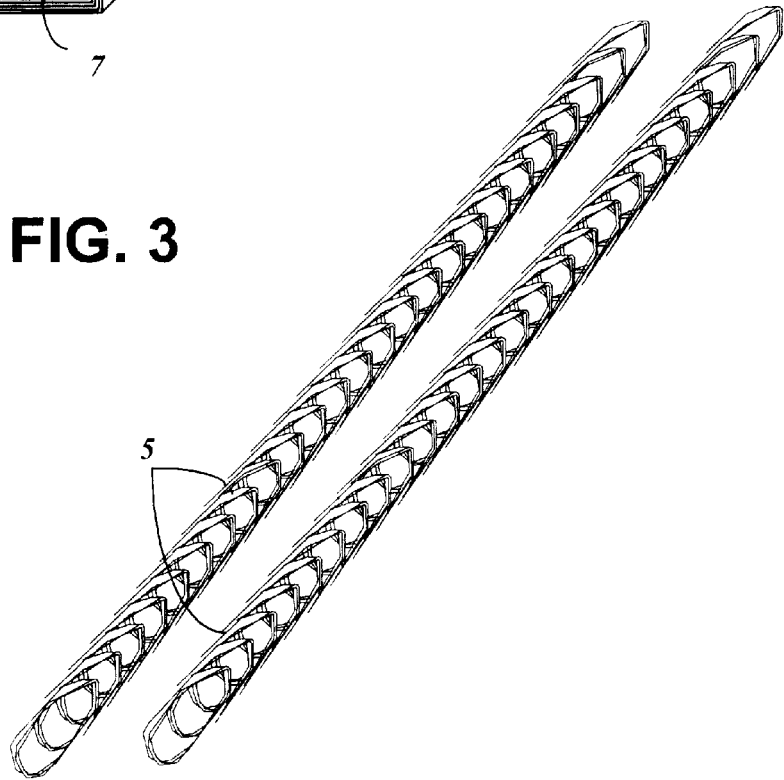
FIG. 3 depicts stator motor 3-phase windings separated from the integrated system.

The stator motor wires 5 are wound around the bilateral slots of the upper part of the stator core 7 as shown in FIG. 3 to produce traveling magnetic fields. The stator motor wires 5 are wound in three-phase way.

Figure 4:
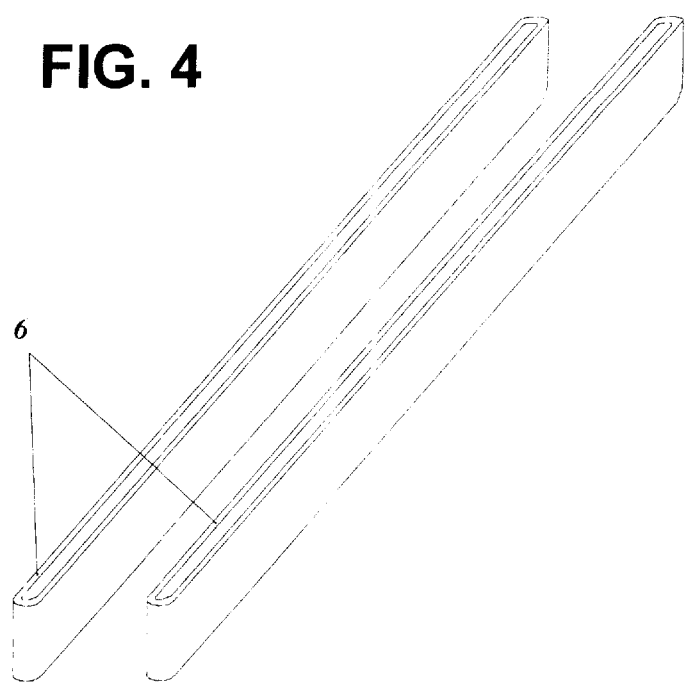
FIG. 4 depicts stator transformer windings separated from the integrated system.

The stator transformer wires 6 are wound around both flanks of the stator core 7 as shown in FIG. 4.

Figure 5:
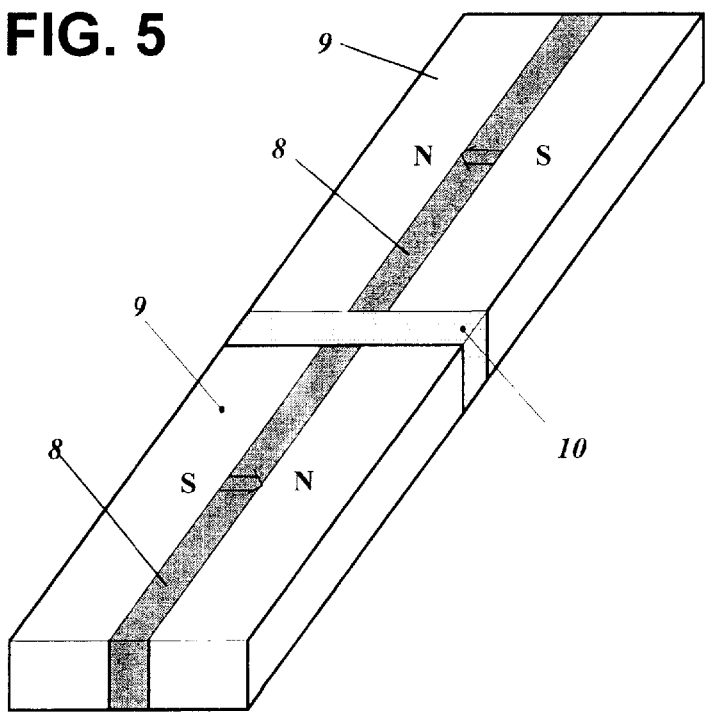
FIG. 5 depicts in detail a motor runner separated from the integrated system.

As aforementioned, the motor runner 2 shown in FIG. 5 consists of the two permanent magnets 8 and the two motor cores 9 for generating a magnetic flux; and the non-magnetic substance 10, placed between the two permanent magnets 8, for diverting the magnetic flux from the permanent magnets 8 to the stator core 7. The two permanent magnets 8 are arranged in such a manner that their polarities are opposite each other. The two permanent magnets 8 are arranged in a line along the longitudinal air gap with the non-magnetic substance 10 inserted therebetween.

The non-contact power feeding unit, a kind of transformer with an air-gap, also uses the stator core 7 of the bilateral permanent magnet excited synchronous motor in common.

Figure 6:
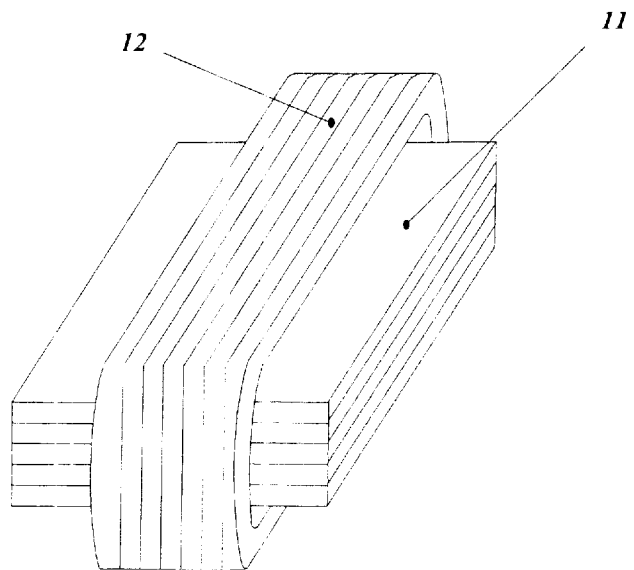
FIG. 6 depicts in detail a runner of a non-contact power feeding apparatus separated from the integrated system.

The non-contact power feeding unit, as aforementioned, consists of a stator transformer windings 6 corresponding to primary windings; a stator core 7 corresponding to a primary core; and a secondary core 11 and secondary windings 12. Both of the secondary core 11 and windings 12 are called a runner 4 of the non-contact power feeding unit. The power feeding unit runner 4 consists of the laminated core 11 and the wires 12 winding the laminated core 11 as shown in FIG. 6.

In the meantime, it may be regarded that the embodiment of FIG. 1 in accordance with the present invention is divided into two parts, namely, a stator part and a moving part. According to this division, the stator part is composed of the stator motor windings 5, the stator transformer windings 6, and the stator core 7, and the moving part is composed of the permanent magnets 8, the motor cores 9, the non-magnetic substance 10, the secondary core 11, and the secondary windings 12.

The operation of the embodiment of FIG. 1 is explained in detail with reference to the drawings 7 and 8.

Figure 7:
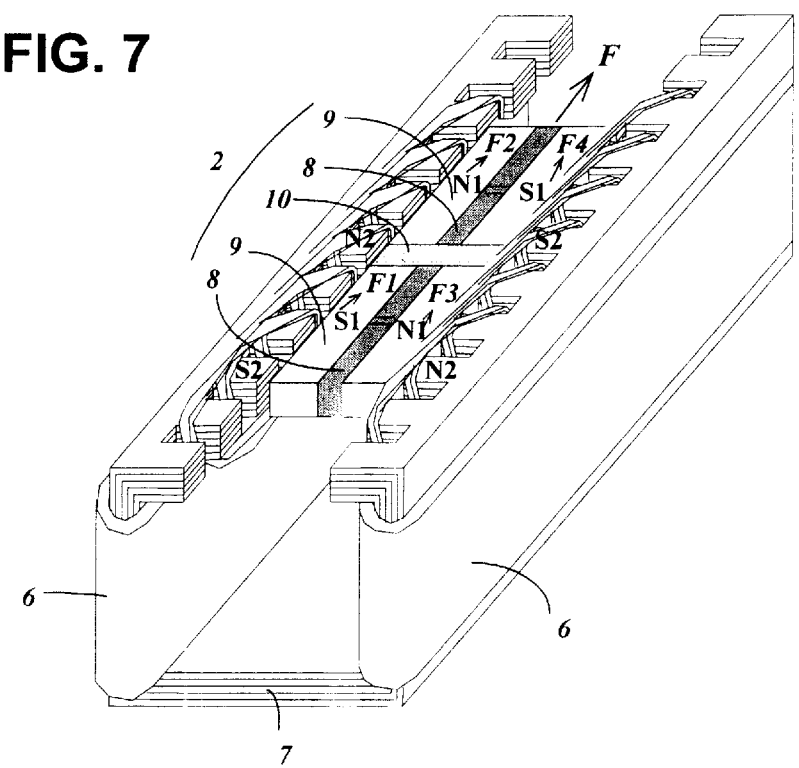
FIG. 7 is a drawing for schematically explaining the principle that a driving force is generated.

FIG. 7 is a drawing for schematically explaining the principle that a driving force is generated.

Figure 8:
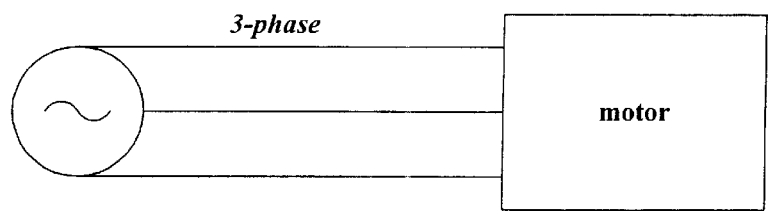
FIG. 8 is a circuit diagram for supplying a three-phase electric power to the motor embodied in accordance with the present invention.

If a three-phase electric power from a three-phase power supplying circuit of FIG. 8 is supplied to the stator motor windings 5, a traveling flux (N2, S2) is generated from the stator and interacts with other flux (N1, S1) produced from the permanent magnets 8. As a result, forces denoted as F1 to F4 in FIG. 8 are generated on the principle that same magnetic poles are repulsive and opposite ones attractive each other. The forces F1 to F4 produce a one-directional resultant force F. Because the velocity of the traveling magnetic fields is equal to that of the motor runner 2 composed of the permanent magnets 8, the motor cores 9, and the non-magnetic substance 10, an electromotive force is not induced in the secondary windings 12 of the power feeding unit.

Figure 9:
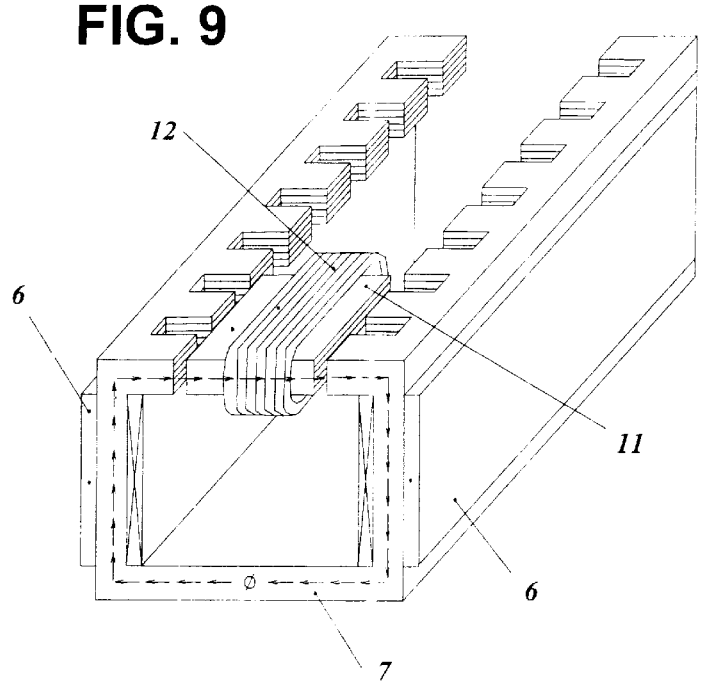
FIG. 9 is a drawing for explaining the operation of the non-contact power feeding unit embodied in accordance with the present invention.

FIG. 9 is a drawing for explaining the operation of the non-contact power feeding unit embodied in accordance with the present invention.

Figure 10:
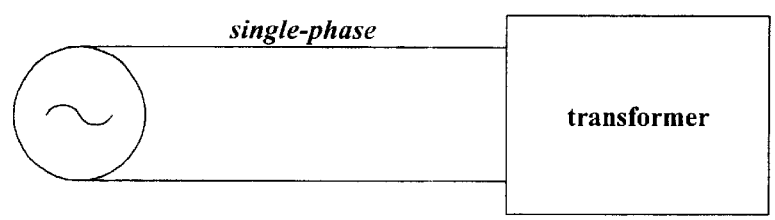
FIG. 10 is a circuit diagram for supplying a single-phase electric power to the non-contact power feeding unit embodied in accordance with the present invention.

If a high-frequency single-phase electric power from a single-phase power supplying circuit of FIG. 10 is supplied to the stator transformer windings 6, an alternating flux φ is generated and then induces an electromotive force in the secondary windings 12 of the non-contact power feeding unit.

In conclusion, if a three-phase electric power and a high-frequency single-phase electric power are applied to the stator motor windings 5 and the stator transformer windings 6, respectively, at the same time, the power feeding unit runner 4 composed of the secondary core 11 and the windings 12 gets a propulsive force and an electric energy without any contact.

The above-explained invention having applied a permanent magnet excited linear synchronous motor to a propulsive system has the high-efficiency and the high driving-force, whereby systems can be lightened more and electric energy can be saved.

In addition, all the problems caused from a contact-way power feeding system, namely, complex structure, troubles due to friction, and so on are completely resolved by the present non-contact-way power feeding system.

Furthermore, the present invention enables non-contact power supply by simply installing a secondary core and a secondary winding at the part of a runner and the primary transformer winding at stator, therefore, this non-contact power feeding way reduces the cost of system manufacture and provides very clean transportation system.

What is claimed is:

1. An integrated system of a permanent magnet excited synchronous motor and a non-contact power feeding apparatus, comprising:

a bilateral permanent magnet excited synchronous motor for generating a linear driving force; and a non-contact power feeding apparatus for receiving an electric power without any mechanical contact from the bilateral permanent magnet excited synchronous motor, wherein the bilateral permanent magnet excited synchronous motor consists of a stator core with an air-gap formed longitudinally at a side; stator motor windings inducing traveling magnetic fields in the stator core; stator transformer wires winding both flanks of the stator core; and a motor runner sliding longitudinally along the air-gap of the stator core, and wherein the non-contact power feeding apparatus consists of a core corresponding to a secondary core of a transformer; and wires winding the core, the wires corresponding to secondary windings of a transformer, the core and the wires of the non-contact power feeding apparatus sliding longitudinally along the air-gap.

2. The integrated system set forth in claim 1, wherein the air-gap is formed at a side of the stator core in such a manner that the motor runner and the core and the wound wires of the non-contact power feeding apparatus are situated movably therein, and the stator core is composed of laminations each of which has slots and teeth along bilateral sides facing the air-gap.

3. The integrated system set forth in claim 1, wherein the stator motor windings are fed with a three-phase electric power.

4. The integrated system set forth in claim 1, wherein the stator transformer windings are fed with a single-phase electric power.

* * * * *